(12) United States Patent
Eklund et al.

(10) Patent No.: US 10,936,302 B2
(45) Date of Patent: Mar. 2, 2021

(54) UPDATING SUB-SYSTEMS OF A DEVICE USING BLOCKCHAIN

(71) Applicant: Volvo Car Corporation, Gothenburg (SE)

(72) Inventors: Kjell Henrik Eklund, Gothenburg (SE); Andreas Martin Viktor Ropel, Gothenburg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/435,237

(22) Filed: Jun. 7, 2019

(65) Prior Publication Data

US 2020/0387367 A1 Dec. 10, 2020

(51) Int. Cl.
*G06F 9/44* (2018.01)
*G06F 8/658* (2018.01)
*H04L 9/08* (2006.01)
*H04L 12/24* (2006.01)
*H04L 9/06* (2006.01)

(52) U.S. Cl.
CPC ............ *G06F 8/658* (2018.02); *H04L 9/0637* (2013.01); *H04L 9/0825* (2013.01); *H04L 41/082* (2013.01)

(58) Field of Classification Search
CPC ..... G06F 8/658; H04L 9/0637; H04L 9/0825; H04L 41/082
USPC .................................. 717/168–177; 709/203
See application file for complete search history.

(56) References Cited

U.S. PATENT DOCUMENTS

| | | | | |
|---|---|---|---|---|
| 6,389,592 B1* | 5/2002 | Ayres | ...................... | G06F 8/658 717/172 |
| 6,401,239 B1* | 6/2002 | Miron | ................. | H04L 63/0807 717/173 |
| 6,751,795 B1* | 6/2004 | Nakamura | .............. | G06F 8/658 717/174 |
| 6,941,453 B2* | 9/2005 | Rao | ........................... | G06F 8/65 713/2 |
| 7,536,687 B1* | 5/2009 | Myers | ..................... | G06F 8/658 717/174 |
| 7,584,466 B1* | 9/2009 | Rao | ........................ | G06F 8/658 717/168 |

(Continued)

OTHER PUBLICATIONS

Baza et al, "Blockchain-based Firmware Update Scheme Tailored for Autonomous Vehicles", IEEE, pp. 1-7 (Year: 2019).*

(Continued)

*Primary Examiner* — Anil Khatri
(74) *Attorney, Agent, or Firm* — Shumaker & Sieffert, P.A.

(57) ABSTRACT

In general, techniques are described by which provide a technique for securely updating sub-systems of a device. A device includes multiple sub-systems including a first sub-system and a second sub-system. Each sub-system includes one or more processors. One or more processors of the first sub-system may be configured to perform the techniques herein. The one or more processors of the first sub-system are configured to download, from one or more nodes of a network, a sub-system update for the second sub-system in response to detecting an update to a ledger of a blockchain associated with the second sub-system. The one or more processors of the first sub-system are further configured to distribute the sub-system update for the second sub-system to the second sub-system.

20 Claims, 7 Drawing Sheets

(56) References Cited

U.S. PATENT DOCUMENTS

| | | | | |
|---|---|---|---|---|
| 7,925,898 | B2* | 4/2011 | Shear | G06Q 20/12 |
| | | | | 713/194 |
| 8,149,844 | B1* | 4/2012 | Roskind | H04L 63/1425 |
| | | | | 370/395.21 |
| 9,967,334 | B2 | 5/2018 | Ford | |
| 10,169,614 | B2* | 1/2019 | Brady | G06F 9/45558 |
| 10,181,948 | B1 | 1/2019 | Nenov et al. | |
| 10,310,824 | B2* | 6/2019 | Eksten | G06F 9/44521 |
| 10,459,709 | B1* | 10/2019 | Troutman | H04L 41/0893 |
| 10,476,879 | B2* | 11/2019 | Bathen | H04L 9/3231 |
| 10,535,207 | B1* | 1/2020 | Goluguri | G07C 5/0841 |
| 10,536,445 | B1* | 1/2020 | Lerner | H04L 9/3239 |
| 10,666,767 | B1* | 5/2020 | Floyd | B60W 50/029 |
| 10,686,611 | B2* | 6/2020 | Ramos | H04L 9/0637 |
| 10,733,160 | B1* | 8/2020 | Leise | G06F 16/182 |
| 2017/0031676 | A1 | 2/2017 | Cecchetti et al. | |
| 2017/0279774 | A1 | 9/2017 | Booz et al. | |
| 2018/0088928 | A1 | 3/2018 | Smith et al. | |
| 2018/0167217 | A1* | 6/2018 | Brady | H04L 67/10 |
| 2018/0176229 | A1 | 6/2018 | Bathen et al. | |
| 2020/0073651 | A1* | 3/2020 | Rodriguez Bravo | |
| | | | | H04L 9/0637 |

OTHER PUBLICATIONS

Li et al, "An Efficient, Secure and Reliable Search Scheme for Dynamic Updates with Blockchain", ACM, pp. 51-57 (Year: 2019).*

Yohan et al, "An Over-the-Blockchain Firmware Update Framework for IoT Devices", IEEE, pp. 1-8 (Year: 2018).*

Shao et al, "LSC: Online auto-update smart contracts for fortifying blockchain-based log systems", Information Sconce, pp. 506-517 http://www.elsevier.com/locate/ins (Year: 2020).*

Choi et al, "Blockchain-Based Distributed Firmware Update Architecture for IoT Devices", IEEE, pp. 37518-37525 (Year: 2020).*

Dhakal et al, "Private Blockchain Network for IoT Device Firmware Integrity Verification and Update", IEEE, pp. 164-170 (Year: 2019).*

Yang et al, "Blockchain-Based Decentralized Trust Management in Vehicular Networks", IEEE, pp. 1495-1505 (Year: 2019).*

He et al, "Securing Over—The—Air IoT Firmware Updates using Blockchain", ACM, pp. 1-8 (Year: 2019).*

Baza et al., "Blockchain-based Firmware Update Scheme Tailored for Autonomous Vehicles," Nov. 14, 2018, 8 pp.

Lee, et al., "Blockchain-based secure firmware update for embedded devices in an Internet of Things environment", Springer Science+ Business Media, Sep. 2016, pp. 1-16.

Li, Abner, "Google Play begins P2P app install beta w/ partners, Files Go Support coming", 9To5Google, Oct. 19, 2018, pp. 1-4.

Khoury, Rita El, "Hands-on with Google Play peer-to-peer app sharing in Files Go", Android Police, Oct. 24, 2018, pp 1-5.

Schoon, Ben, "Google Keep will soon support Assistant's shopping list feature once again", 9To5Google, Oct. 19, 2018, pp. 1-6.

* cited by examiner

UPDATING SUB-SYSTEMS OF A DEVICE USING BLOCKCHAIN

TECHNICAL FIELD

This disclosure relates to vehicles and, more specifically, updating various sub-systems of vehicles.

BACKGROUND

Vehicles are becoming increasingly dependent on computerized systems to manage the various mechanical operations and user-facing features of the vehicle. As with most computerized systems, the systems inside the vehicle rely on software and firmware updates in order to maintain safe and effective operation. These updates are typically only available from the main server, meaning that the vehicle must somehow be in communication with the main server in order to download and install the update. Further, each sub-system of the vehicle, of which there could be hundreds or more in a single vehicle, use its own specific software and firmware that must be individually managed and updated. This could involve requiring a direct internet connection to download the update from the main server.

SUMMARY

In general, techniques are described for enabling a vehicle to update software or firmware of a sub-system utilizing blockchain technology and network communication, such as peer-to-peer communication. This update process includes using a first sub-system of the device to monitor a blockchain to detect when updates are available for a second sub-system. Upon detecting the update to the ledger of the blockchain, the first sub-system may download the update for the second sub-system over the peer-to-peer network. Each of the potentially hundreds of sub-systems in the device may correspond with a distinct blockchain that stores the software and firmware updates for the corresponding particular sub-system. As these files may be quite large, each sub-system may correspond with a second blockchain that only includes the version number of the software or firmware being updated, in addition to the metadata typically included in blockchain blocks. As such, the first sub-system, which monitors each of the blockchains to detect updates, may only monitor the set of blockchains that include the version numbers in an effort to increase efficiency of the checks. By detecting an update to the version number blockchain for a particular sub-system, the first sub-system may proceed to download the actual software or firmware update from the blockchain that stores such information without having to monitor and process the large amounts of data stored in each of the blockchains. By storing the updates in, and downloading the updates from, an immutable blockchain, the techniques may keep the various sub-systems within the vehicle up-to-date to increase the safe and efficient operation of the vehicle, thereby improving the operation of the vehicle itself. For example, by using an immutable blockchain, the techniques described herein may enable peer-to-peer updates of critical components, as the device installing these updates can verify that the distributed update packages have not been compromised.

In one example, aspects of the techniques are directed to a device that includes a plurality of sub-systems including a first sub-system and a second sub-system. Each sub-system of the plurality of sub-system comprise one or more processors. One or more processors of the first sub-system are configured to download, from one or more nodes of a network, a sub-system update for the second sub-system in response to detecting an update to a ledger of a blockchain associated with the second sub-system, wherein the first sub-system is different than the second sub-system. The one or more processors of the first sub-system are further configured to distribute the sub-system update for the second sub-system to the second sub-system.

In another example, aspects of the techniques are directed to a device that includes means for downloading, from one or more nodes of a network, and to a first sub-system of a plurality of sub-systems of the device, a sub-system update for a second sub-system of the plurality of sub-systems of the device in response to detecting an update to a ledger of a blockchain associated with the second sub-system, wherein the first sub-system is different than the second sub-system. The device further includes means for distributing the sub-system update for the second sub-system to the second sub-system.

In another example, aspects of the techniques are directed to a method that includes downloading, by a first-subsystem of a device comprising a plurality of sub-systems, and from one or more nodes of a network, a sub-system update for a second sub-system of the plurality of sub-systems of the device in response to detecting an update to a ledger of a blockchain associated with the second sub-system, wherein the first sub-system is different than the second sub-system. The method further includes distributing, by the first sub-system, the sub-system update for the second sub-system to the second sub-system.

In another example, aspects of the techniques are directed to a non-transitory computer-readable medium having stored thereon instructions that, when executed, cause one or more processors of a first sub-system of a device to download, from one or more nodes of a network, a sub-system update for the second sub-system in response to detecting an update to a ledger of a blockchain associated with the second sub-system, wherein the first sub-system is different than the second sub-system. The instructions, when executed, further cause the one or more processors of the first sub-system of the device to distribute the sub-system update for the second sub-system to the second sub-system.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
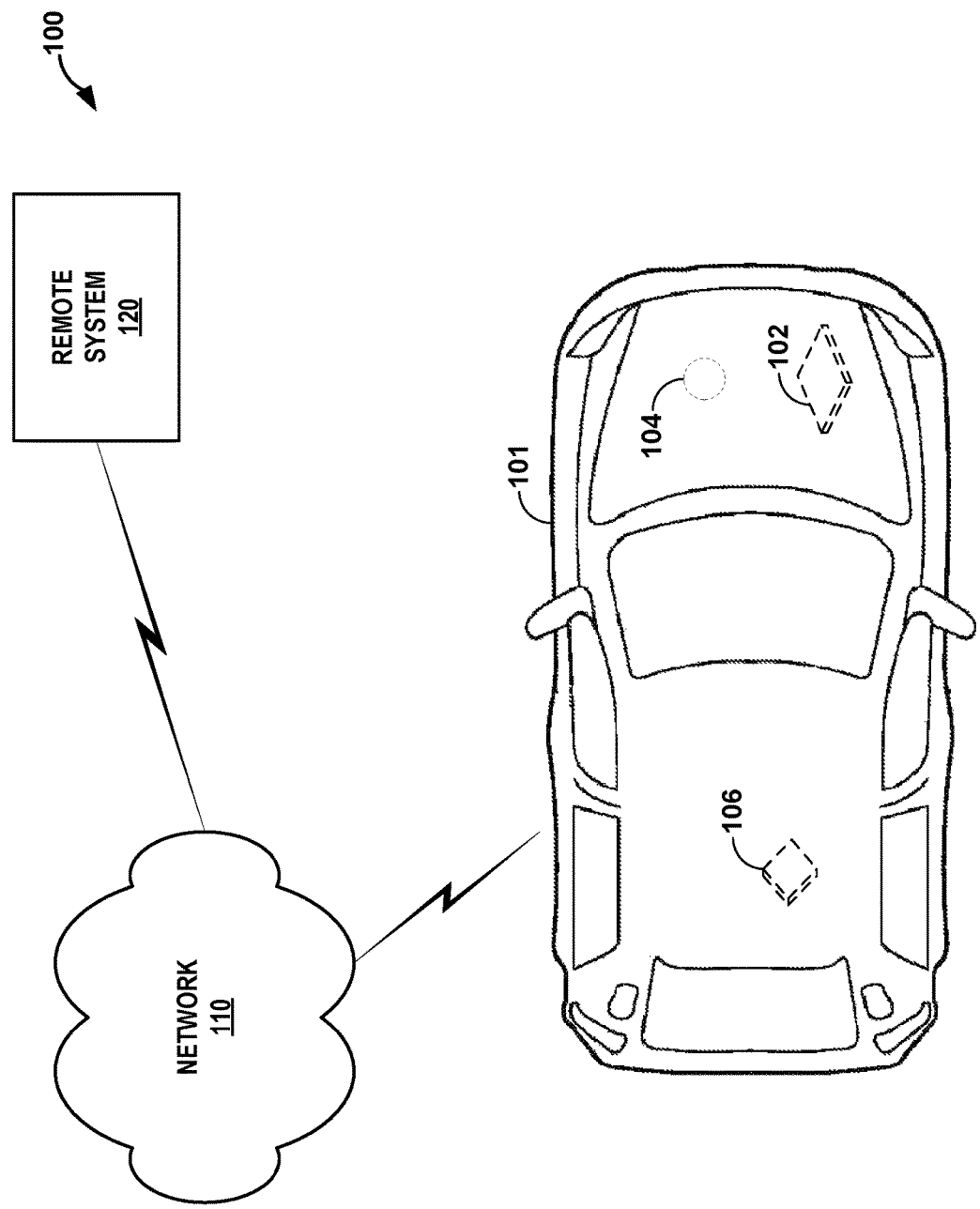
FIG. 1 is a diagram illustrating an example system configured to perform various aspects of the sub-system update techniques described in this disclosure.

FIG. 1 is a diagram illustrating an example system 100 configured to perform various aspects of the sub-system update techniques described in this disclosure. As shown in the example of FIG. 1, system 100 includes a vehicle 101, a network 110, and a remote system 120.

Although shown as an automobile in the example of FIG. 1, vehicle 101 may represent any type of vehicle, including an automobile, a truck, farm equipment, a motorcycle, a bike (including electronic bikes), a scooter, construction equipment, a semi-truck, an airplane, a helicopter, a military vehicle, or any other type of vehicle capable of implementing various aspects of the machine learning based vehicle diagnostic techniques described in this disclosure.

Network 110 may represent any type of network by which communication between vehicle 101 and remote system 120 may be accomplished. Network 110 may represent a public network (e.g., the Internet), a private network, a cellular network (including various cellular data network, such as a 3G, 4G and/or 5G network), a personal area network, a peer-to-peer communication network, or combinations thereof.

Remote system 120 may represent one or more devices configured to communicate via network 110 with vehicle 101. Remote system 120 may communicate via network 110 with vehicle 101 to monitor or otherwise retrieve diagnostic data concerning sub-system 106 of vehicle 101, which may be an engine, an anti-lock braking system (ABS), a traction control (TC) system, an electronic stability control (ESC) system, brake system, heads-up display system, coolant system, navigation system, infotainment system, or any other component or system integrated into vehicle 101 or in communication with vehicle 101 that utilizes software and/or firmware. Remote system 120 may, in addition or as an alternative to monitoring vehicle 101, communicate with vehicle 101 to update sub-system 106 of vehicle 101. For example, remote system 120 may include one or more nodes of a peer-to-peer network that each store one or more blockchains, each blockchain including at least an indication of version numbers and/or software/firmware updates for the various components of vehicle 101.

As further shown in the example of FIG. 1, vehicle 101 includes a computing device 102, one or more sensors 104, and one or more sub-systems (represented generally by sub-system 106). Computing device 102 may itself be considered a sub-system. Computing device 102, sensors 104, and sub-system 106 are shown in the example of FIG. 1 using dashed lines to denote that computing device 102, sensors 104, and sub-system 106 may not be visible or are otherwise integrated within vehicle 101.

Computing device 102 may include one or more electronic control unit (ECUs) and a computing device. For example, computing device 102 may include an ECU configured to control sub-system 106, an ECU configured to control the ABS and/or the TC, an ECU configured to control the ESC system, and a main ECU acting as the computing device to direct operation of all of the systems (including those not listed in this example). Generally, an ECU includes a microcontroller, and memory (such as one or more of static random access memory—SRAM, electrically erasable programmable read-only memory—EEPROM, and Flash memory), digital and/or analog inputs, digital and/or analog outputs (such as relay drivers, H bridge drivers, injector drivers, and logic outputs).

In some examples, rather than utilize an ECU as the computing device, computing device 102 may include a relatively more powerful processor (compared to the microcontroller) configured to execute instructions or other forms of software to perform various aspects of the machine learning based vehicle diagnostic techniques described in this disclosure. The processor may represent one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. When the techniques are implemented partially in software, computing device 102 may store instructions for the software in a suitable, non-transitory computer-readable medium and execute the instructions in hardware using one or more processors to perform the techniques of this disclosure. A device including computing device 102 may comprise an integrated circuit, and/or a microprocessor.

For purposes of illustration, computing device 102 is assumed to represent a processor communicatively coupled to one or more ECUs responsible for controlling operation of sub-system 106. Sensors 104 may be communicatively coupled to computing device 102 and may be configured to monitor sub-system 106 of vehicle 101.

Sub-system 106 may be representative of any system or sub-system in vehicle 101 that may have updates applied to software or firmware of the component. For instance, sub-system 106 may be the entirety of, a portion of, or a fluid inside of the engine, the ABS, the TC system, the ESC system, the brake system, the heads-up display system, the coolant system, the navigation system, the infotainment system, the powertrain, the exhaust system, the fuel bus, the gearbox, the shock absorbers, the wheels, or any other operational component of vehicle 101 that utilizes software and/or firmware in some way.

In accordance with various aspects of the techniques described in this disclosure, computing device 102 may detect that a blockchain that includes version numbers of updates for sub-system 106 in vehicle 101 has been updated to include a new version number. Computing device 102 may download the update file for sub-system 106 over network 110, either from an issuing node directly or using peer-to-peer communication. Computing device 102 may then distribute the update file to sub-system 106. The use of blockchain technology ensures that the data associated with the updates (e.g., the version numbers and the update file itself) is immutable and valid throughout the vehicle lifecycle.

The version number and the sub-system update file may be stored on one or more blockchains in a secured area i.e. at least in vehicle 101 and one or more other nodes in network 110 and remote system 120. Computing device 102 may act as a communication system, monitoring the respective version number blockchains for each of sub-system in vehicle 101. When updates are detected in the version number blockchains, computing device 102 may initiate a download with remote system 120 for the corresponding update file stored in a second blockchain. By monitoring the version number blockchain as opposed to the update file blockchain, computing device 102 may store smaller files (e.g., the version number may be only a small string of text as opposed to the entirety of the software and/or firmware package of the update file) and may consume less processing power by analyzing the smaller version number blockchain as opposed to the full file blockchain. As vehicle 101 may include hundreds of sub-systems, monitoring the large update files for each sub-system would be strenuous on the processors of computing device 102, and monitoring the smaller version number blockchain may remove or limit that stress. Further, computing device 102 may have the decryption key for the version number blockchains, but may not necessarily have the decryption key for each of the various sub-systems and their update file blockchains. Rather, the respective sub-system corresponding with the update file may be the only sub-system with the decryption key needed to ascertain the code in the update file, further adding to the security and immutability of the overall system.

A blockchain is a series of blocks that are linked to one another using cryptography, such as a hash function. Each block of the blockchain includes a hashed version of the previous block of the blockchain, a timestamp of the update to the blockchain, the new information for the blockchain, and, potentially, additional information about the transaction adding the new information, such as a user identification or some other sort of metadata. The initial instance of a new transaction is issued from some node in the system and to another node in the system. If the issuer node is connected to each other node in the system, the issuer node may distribute the update to each other node in the system, enabling every node in the system to maintain an immutable, up-to-date version of the blockchain upon the blockchain being updated. In other instances, such as where the issuer node is not connected to other nodes in the system, a peer-to-peer network may be utilized to distribute the blocks throughout the nodes participating in the blockchain storage system. By including a hashed version of the previous block and a timestamp for each transaction in each block of the blockchain, nodes in the peer-to-peer network need not explicitly receive each block in the system, but may always ensure the node is storing the most up-to-date version of the blockchain possible through comparison of the timestamp in the most recent block stored on the node to a timestamp in the most recent block stored on another node in the peer-to-peer network.

Furthermore, each node may individually verify that any updates to the blockchain are valid using the hashed version of the previous block that must be included in any transaction to the blockchain. For instance, if a node determines that the hashed portion of a new transaction does, in fact, include the most recent block of the blockchain stored in the node, then the node may approve the transaction as a valid transaction. Conversely, if the node determines that the hashed portion of the new transaction does not include the most recent block of the blockchain stored in the node, then the node may determine the transaction is invalid. Furthermore, since each block includes a hash of the previous block, a most recent block of the blockchain would include, in order, a history of every valid transaction in the blockchain. As such, if the node determines that various details of the history of blocks hashed into the most recent block is incorrect, the node may determine that the new transaction is invalid. Furthermore, if the node determines that the timestamp information for the new block is incompatible with the most recent block in the blockchain, such as if the timestamp in the transaction is before a timestamp of the most recent block in the blockchain stored on the node, the node will determine that the transaction is invalid.

In this manner, blockchain provides a reliable, immutable system to maintain updated records of what the issuer node has deemed to be valid update files to software or firmware for sub-system 106 in vehicle 101. New update files may be released into market on an inconsistent basis. However, by enabling an issuer node to push updates to nodes of a network, peer-to-peer or otherwise, via blockchain transactions, vehicle 101 may consistently maintain a record of which sub-systems should be updated at any given time. These update files may be critical to certain aspects of vehicle 101, and failure to update the files in a timely manner may result in unsafe or inefficient operation of vehicle 101. By ensuring the timely and valid installation of update files for every sub-system 106 in vehicle 101, vehicle 101 may continue operating effectively.

Figure 2:
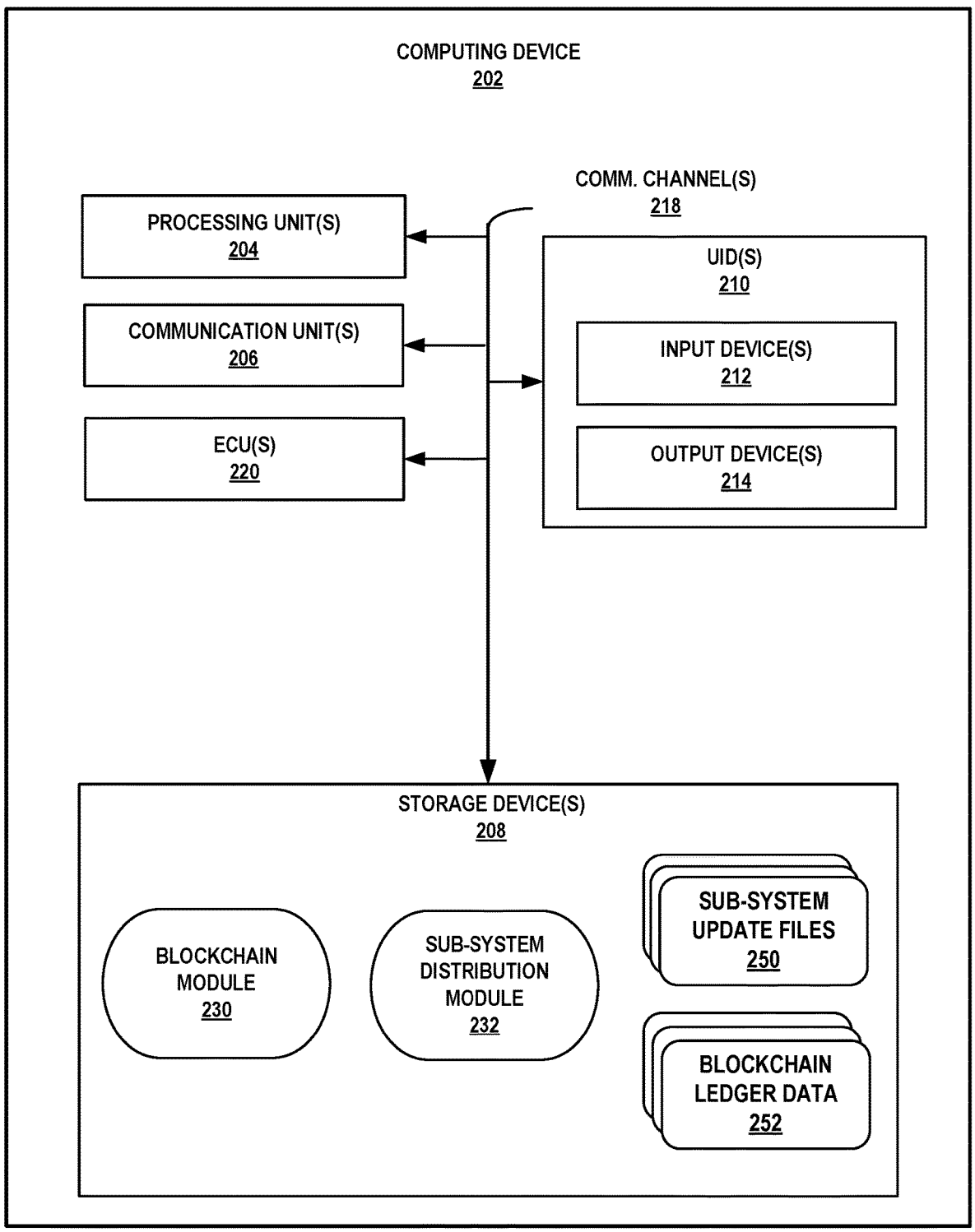
FIG. 2 is a block diagram illustrating an example computing system configured to perform various aspects of the sub-system update techniques described in this disclosure.

FIG. 2 is a block diagram illustrating an example computing device 202 configured to perform various aspects of the sub-system update techniques described in this disclosure. Computing device 202 represents an example of computing device 102 described above with reference to FIG. 1. As illustrated in FIG. 2, computing device 202 includes at least one processing unit 204, at least one communication unit 206, at least one storage device 208, at least one user interface device (UID) 210, at least one communication channel 218, and one or more ECUs 220. FIG. 2 illustrates only one particular example of computing device 202, and many other examples of computing device 202 may be used in other instances and may include a subset of the components included in example computing device 202 or may include additional components not shown in FIG. 2.

In one example, computing device 202 may be, or may be incorporated in, any electronic computing device with components that may be replaced, added to, or removed from the device itself. In some examples, computing device 202 may be, or may be incorporated in, a motor vehicle, such as the example described in FIG. 1. In other examples, computing device 202 may be some other device, such as a smartphone, a computerized watch (e.g., a smart watch), computerized eyewear, computerized headwear, other types of wearable computing devices, a tablet computer, a personal digital assistant (PDA), a laptop computer, a desktop computer, a gaming system, a media player, an e-book reader, a television platform, an automobile navigation system, a digital camera, or any other type of mobile and/or non-mobile computing device that is configured to perform a component verification operation as described herein.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 206 may represent a unit configured to communicate with one or more other computing devices by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., long term evolution (LTE)) radios, Bluetooth™ radios, WiFi™ radios, or any other wireless radios.

In some examples, storage device 208 may represent a unit configure to store one or more modules, such as blockchain module 230 and sub-system distribution module 232 shown in FIG. 2. Storage device 208 may be a temporary memory, meaning that a primary purpose of storage device 208 is not long-term storage. Storage device 208 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 to perform the techniques of this disclosure. For example, storage device 208 may include data or information associated with one or more modules 230 and 232.

User interface devices (UID) 210 may represent a unit configured to enable a user to interact with computing device 202. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

ECUs 220 may represent one or more electronic control units configured to control electronics and various sub-systems of vehicle 101, such as the above noted ABS and ESC system. ECUs 220 may each be implemented as an embedded system, which may include a microcontroller or other type of processor, memory, inputs, and outputs as noted above. ECUs 220 may interface with one or more of sensors 104 (FIG. 1) in the manner described above in support of the electronics and/or sub-systems.

Communication channels 218 may represent a unit configured to interconnect each of components 204, 206, 208, 210, and/or 220 for inter-component communications (physically, communicatively, and/or operatively). In some examples, communication channels 218 may include a system bus, a network connection, one or more inter-process communication data structures, or any other components for communicating data.

As further shown in the example of FIG. 2, storage device 208 stores a blockchain module 230 and a sub-system distribution module 232. Processing units 204 may interface with storage device 208 to retrieve one or more instructions of blockchain module 230 that, when executed, cause processing units 204 to perform operations directed to collection of sub-system update files 250 from one or more nodes of a network via communication channels 218. Similarly, processing units 204 may interface with storage device 208 to retrieve one or more instructions of sub-system distribution module 232 that, when executed, cause processing units 204 to perform operations directed to distributing sub-system update files 250 to the corresponding sub-system able to read and install the particular sub-system update file 250, as discussed above. Reference to modules 230 and 232 performing various operations should be understood to refer to processing units 204 performing the various operations discussed with respect to each of modules 230 and 232.

In any event, blockchain module 230 may execute one or more communication protocols, such as the above noted controller area network (CAN) communication protocol, to interface with ECUs 220 and thereby indirectly interface with sub-system 106 to communicate the sub-system update file 250 to sub-system 106. Blockchain module 230 may store sub-system update files 250 to storage device 208.

Blockchain module 230 may also maintain one or more instances of blockchain ledger data 252. For instance, in some examples, a single blockchain (and a single instance of blockchain ledger data 252) may store all information pertinent to each component that may be installed or updated into a computing system that includes computing device 202. In other examples, a different blockchain (and different blockchain ledger data 252) may be used to store data associated with software and/or firmware updates that may be installed or added into a sub-system of a computing system that includes computing device 202. In other instances, for each sub-system of a computing system that may utilize updateable software and/or firmware, a second blockchain including version numbers of the software and/or firmware for each sub-system may also be stored in blockchain ledger data 252. In some instances, each sub-system of the computing system that includes computing device 202 may be associated with a plurality of blockchains that may store any combination of software updates for the sub-system, firmware updates for the sub-system, software updates for applications that execute on the sub-system, version numbers of the software for the sub-system, version numbers of the firmware for the sub-system, and version numbers of the software updates for the applications that execute on the sub-system. Blockchain module 230 may leverage communication units 206 to communicate with other nodes of a network to maintain up-to-date software and firmware in blockchain ledger data 252 for the sub-systems. After sufficient data is collected, blockchain module 230 may invoke sub-system distribution module 232.

For the purposes of this example with regards to FIG. 2, computing device 202 is a component of a larger system of components, such as vehicle 101, that detects the availability for sub-system updates for various sub-systems outside of computing device 202 (e.g., sub-system 106). However, in other instances, computing device 202 may itself include additional components that may be updated.

Blockchain module 230 may monitor a blockchain that includes indications of sub-systems updates for a sub-system on the same overall computing system as computing device 202 but separate from computing device 202. In response to detecting an update to a ledger of the blockchain, blockchain module 230 may download, from one or more nodes of a network, sub-system update file 250 for the second sub-system. In downloading sub-system update file 250, blockchain module 230 may download sub-system update file 250 entirely from a single node of the network, such as from the server pushing the blockchain update itself. In instances where the network is a peer-to-peer network, blockchain module 230 may download sub-system update file 250 from a single node of the peer-to-peer network, such as from a non-vehicle mobile computing device or another vehicle that has already downloaded and installed the update. In other instances where the network is a peer-to-peer network, blockchain module 230 may download, from a first node of the peer-to-peer communication network, a first portion of sub-system update file 250, and may further download, from a second node of the peer-to-peer communication network, a second portion of sub-system update file 250. Sub-system distribution module 232 may then distribute the sub-system update for the sub-system to the sub-system.

In some instances, the blockchain may be a first blockchain that includes version numbers associated with sub-system updates for the particular sub-system. As such, by performing a listening function to detect the update to the first blockchain, blockchain module 230 is detecting a transaction that pushes a new version number to the most recent block of the blockchain. In such instances, sub-system update file 250 may be stored throughout the network in a second blockchain. Therefore, in downloading sub-system update file 250, blockchain module may be downloading the most recent block in the second blockchain that the issuer node pushes along with the new version number.

By separating the version number of sub-system update file 250 and sub-system update file 250 itself into two separate blockchains, the processing power required by blockchain module 230 to monitor the blockchains for update is reduced. This is because the blockchain containing only the version numbers of sub-system update file 250 may only include small strings in each block, as opposed to sub-system update file 250 itself, which may include large amounts of code and files required for installation. As computing device 202 may be required to monitor hundreds of these blockchains, reducing the size of the blockchains that require monitoring to the extent provided herein would greatly reduce the processing power and memory consumption for the techniques provided herein.

Sub-system update file 250 may be encoded. Since computing device 202 need not monitor any of the data in the blockchain that includes sub-system update file 250, computing device 202 may not have the decryption key needed to decrypt sub-system update file 250. This may further ensure the immutability of the update file itself. Instead, only the particular sub-system that sub-system update file 250 is intended to alter may have the decryption key required to decrypt sub-system update file 250.

Each sub-system may utilize different blockchains for their respective update files, and may also have different blockchains for the type of update file (e.g., a software update, a firmware update, or an application update). As such, blockchain module 230 may monitor another blockchain to detect updates for other sub-systems in the computing system that also includes computing device 202.

Similarly, blockchain module 230 may download, from the one or more nodes of the network, a sub-system update for the additional sub-system in response to detecting an update to a ledger of a second blockchain that indicates updates for the additional sub-system. Sub-system distribution module 232 may then distribute the sub-system update for the additional sub-system to the additional sub-system.

The blockchain that includes the version number of sub-system update file 250 may further include meta-data that identifies the particular sub-system that sub-system update file 250 is to be installed on. As such, sub-system distribution module 232 may determine, based on meta-data for the blockchain, that sub-system update file 250 is for a particular sub-system of the plurality of sub-systems include in the computing system. Distribution module 232 may then send sub-system update file 250 to the identified sub-system.

Figure 3:
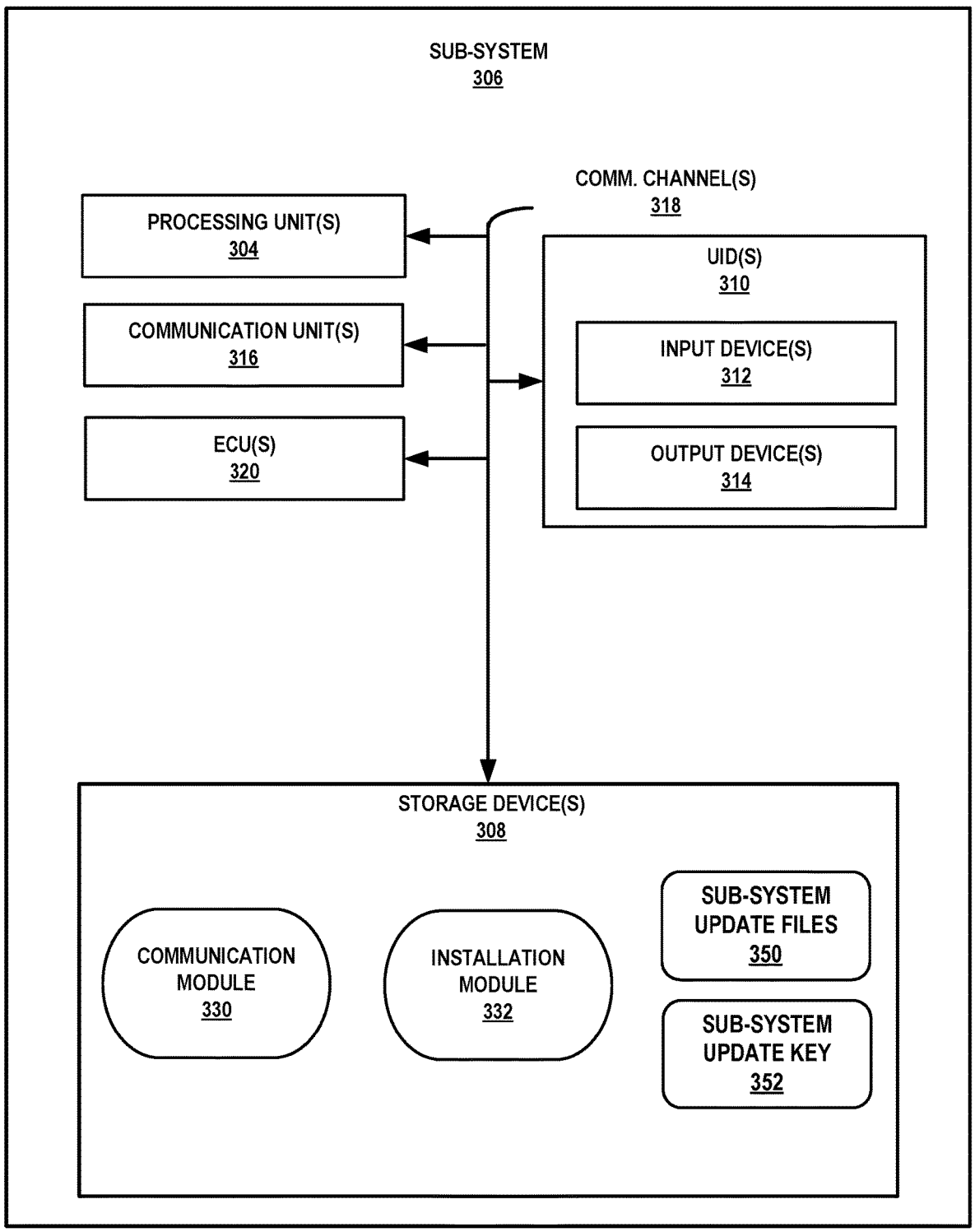
FIG. 3 is a block diagram illustrating an example sub-system configured to perform various aspects of the sub-system update techniques described in this disclosure.

FIG. 3 is a block diagram illustrating an example sub-system configured to perform various aspects of the sub-system update techniques described in this disclosure. Sub-system 306 represents an example of sub-system 106 described above with reference to FIG. 1. As illustrated in FIG. 3, sub-system 306 includes at least one processing unit 304, at least one communication unit 316, at least one storage device 308, at least one user interface device (UID) 310, at least one communication channel 318, and one or more ECUs 320. FIG. 3 illustrates only one particular example of sub-system 306, and many other examples of sub-system 306 may be used in other instances and may include a subset of the components included in example sub-system 306 or may include additional components not shown in FIG. 3.

In one example, sub-system 306 may be, or may be incorporated in, any electronic computing device with components that may be replaced, added to, or removed from the device itself. In some examples, sub-system 306 may be, or may be incorporated in, a motor vehicle, such as the example described in FIG. 1.

Processing units 304 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 316 may represent a unit configured to communicate with one or more other computing devices by transmitting and/or receiving data. Communications units 316 may include wired and/or wireless communication units. Examples of wired communication units 316 include Universal Serial Bus (USB) transceivers. Examples of wireless communication units 316 include GPS radios, cellular (e.g., LTE) radios, Bluetooth™ radios, WiFi™ radios, or any other wireless radios.

In some examples, storage device 308 may represent a unit configure to store one or more modules, such as communication module 330 and installation module 332 shown in FIG. 3. Storage device 308 may be a temporary memory, meaning that a primary purpose of storage device 308 is not long-term storage. Storage device 308 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 308 may include one or more non-transitory computer-readable storage devices. Storage device 308 may be configured to store larger amounts of information than typically stored by volatile memory. Storage device 308 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 308 may store program instructions and/or information (e.g., data) that, when executed, cause processing unit 304 to perform the techniques of this disclosure. For example, storage device 308 may include data or information associated with one or more modules 330 and 332.

User interface devices (UID) 310 may represent a unit configured to enable a user to interact with sub-system 306. UIDs 310 may include one or more input devices 312 and/or more output devices 314. Examples of input devices 312 include display devices, keyboards, pointing devices (such as a mouse or digital pen), microphones, physical buttons or knobs, among others. Examples of output devices 314 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

ECUs 320 may represent one or more electronic control units configured to control electronics and various sub-systems of vehicle 101, such as the above noted ABS and ESC system. ECUs 320 may each be implemented as an embedded system, which may include a microcontroller or other type of processor, memory, inputs, and outputs as noted above. ECUs 320 may interface with one or more of sensors 104 (FIG. 1) in the manner described above in support of the electronics and/or sub-systems.

Communication channels 318 may represent a unit configured to interconnect each of components 304, 316, 308, 310, and/or 320 for inter-component communications (physically, communicatively, and/or operatively). In some examples, communication channels 318 may include a system bus, a network connection, one or more inter-process communication data structures, or any other components for communicating data.

As further shown in the example of FIG. 3, storage device 308 stores a communication module 330 and an installation module 332. Processing units 304 may interface with storage device 308 to retrieve one or more instructions of communication module 330 that, when executed, cause processing units 304 to perform operations directed to collection of sub-system update files 350 from computing device 202 via communication channels 218. Similarly, processing units 304 may interface with storage device 308 to retrieve one or more instructions of installation module 332 that, when executed, cause processing units 304 to perform operations directed to installing sub-system update files 350 using sub-system update decryption key 352. Reference to modules 330 and 332 performing various operations should be understood to refer to processing units 304 performing the various operations discussed with respect to each of modules 330 and 332.

For instance, in accordance with the techniques described herein, communication module 330 may receive sub-system update file 350 from computing device 202. In this instance, sub-system 306 and computing device 202 are different components incorporated into the same overall computing system (e.g., vehicle 101). Upon receiving sub-system update file 350, installation module 332 may install sub-system update file 350, which may be either a software update for sub-system 306, a firmware update for sub-system 306, or a software update to one or more applications that execute on sub-system 306. Sub-system update file 350 may be a hashed file. As such, installation module 332 may leverage sub-system update decryption key 352 to decrypt sub-system update file 350 prior to installing sub-system update file 350.

Sub-system update file 350 may be a block in a blockchain for update files for sub-system 306. As such, sub-system 306 may continuously store each version of the sub-system update file to maintain the blockchain integrity. If another computing system is in communication with computing device 202 to request the most up-to-date version of sub-system update file 350, communication module 330 may send sub-system update file 350 back to computing device 202 for dispersal to the requesting computing system.

Figure 4:
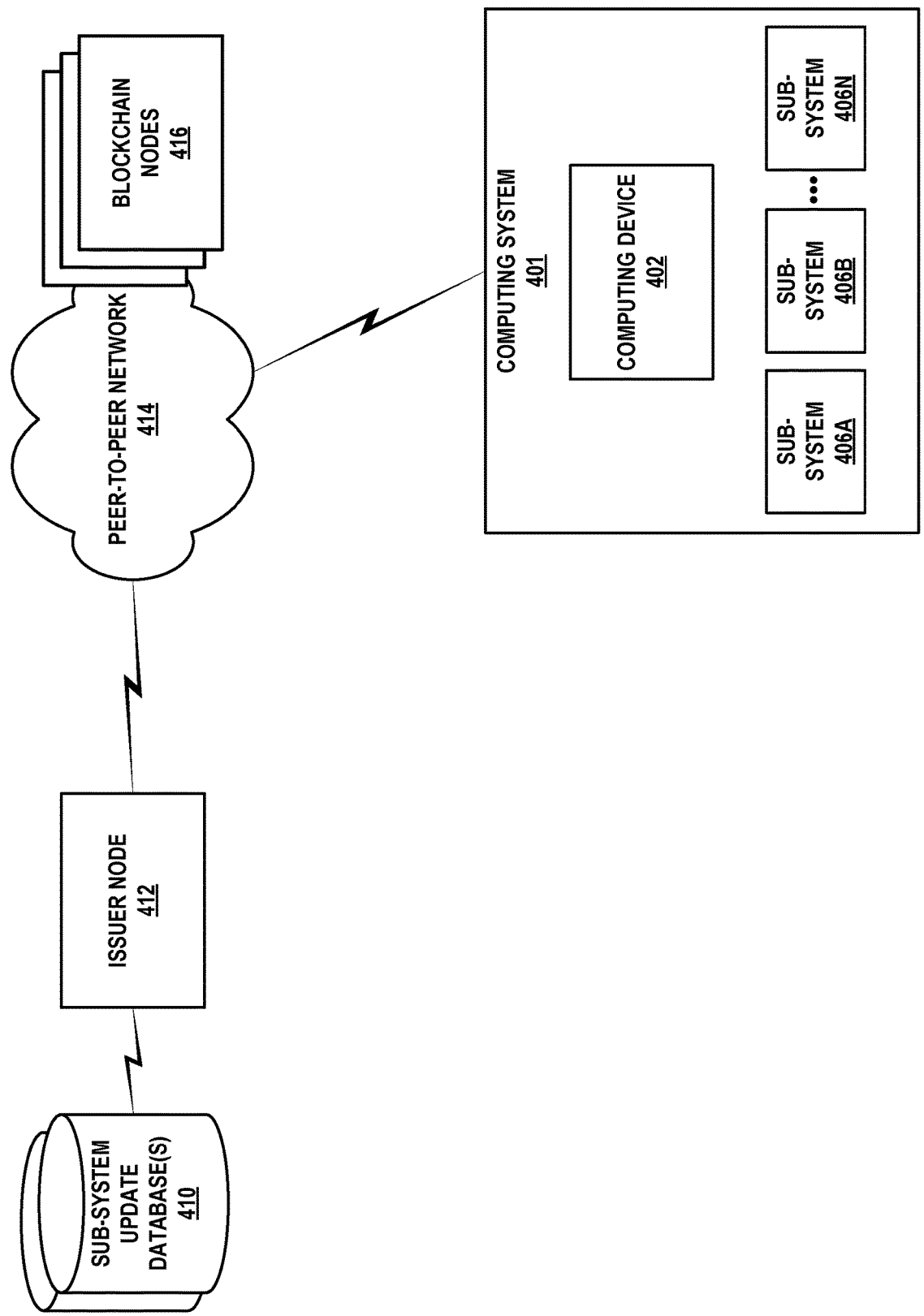
FIG. 4 is a conceptual diagram illustrating a system in which a computing system accesses a blockchain stored throughout a network in accordance with various aspects of the sub-system update techniques described in this disclosure.

FIG. 4 is a conceptual diagram illustrating a system in which a computing system accesses a blockchain stored throughout a network in accordance with various aspects of the sub-system update techniques described in this disclosure. In the example of FIG. 4, the network is shown as peer-to-peer network 414. As shown in the example of FIG. 4, the system includes computing system 401, issuer node 412, peer-to-peer network 414, and one or more blockchain nodes 416.

The techniques described herein include a hierarchical method to ensure that sub-systems 406A-406N (collectively, sub-systems 406) are properly updated in computing system 401. In this system, there may be a server, or issuer node 412, a communication sub-system within a vehicle that is configured to communicate with outside devices (e.g., computing device 402 within computing system 401), and multiple individual sub-systems (e.g., sub-systems 406) that are in communication with the communication sub-system.

Issuer node 412 of the system initializes the network, including setting the various public and private decryption keys to be used in the hash functions performed on the update files and the content identification for the files. Issuer node 412 then creates a sub-system update databases 410, which may include version numbers and update files for each instance of software and firmware throughout sub-systems 406. Issuer node 412 populates and encrypts a first entry into this database for each of sub-systems 406 could require software/firmware updates during the life of computing system 401. Issuer node 412 then distributes the relevant portions of the hash to the requisite blockchain nodes 416 and computing system 401.

Each blockchain node 416 in the system, as well as computing system 401, may have a version of computing device 402 that acts as a communication sub-system configured to read the various version number blockchains that reflect the version numbers stored in sub-systems update databases 410. Computing device 402 may listen for updates to the various version number blockchains, detecting whether any software or firmware for any of the relevant sub-systems to the vehicle have a pending update. Computing device 402 may perform this listening function through peer-to-peer communication with blockchain nodes 416 and issuer node 412 to detect the update to the version number blockchain.

Issuer node 412 may initialize a push of a firmware update for sub-system 406A by updating the version number blockchain with the hashed version number of the firmware update file for sub-system 406A. Issuer node 412 pushes this update through to blockchain nodes 416 and is ultimately detected by computing device 402. With this update to the version number blockchain for sub-system 406A, computing device 402 detects that an update for sub-system 406A is pending. Computing device 402 can download the updated file through any of a number of ways. The communication sub-system retrieve the updated file either directly from issuer node 412 (via a Wi-Fi®, LTE, or other cellular connection) over peer-to-peer network 414 or from any of blockchain nodes 416 over peer-to-peer network 414. Computing device 402 may also download the update file from multiple different devices, downloading portions of the file from a number of other blockchain nodes 416 that have already downloaded and installed the update. In other instances, computing device 402 may download the entire file from a single one of issuer node 412 or blockchain nodes 416 that have already downloaded and installed the update.

Computing device 402 may not have the decryption key for the update to sub-system 406A. Instead, computing device 402 may simply act as a relay to retrieve the necessary update file and distribute the update file to sub-system 406A. While these techniques are described with regards to firmware, similar techniques may be utilized to update software running on sub-systems 406, or to update a particular application within the software running on sub-systems 406. Any code that could be updated in computing system 401 may be updated in this manner.

By utilizing a different blockchain for the version number of each update file, as well as a different blockchain for each update file itself, computing device 402 may be able to effectively and efficiently monitor hundreds of blockchains to detect when updates have been pushed by issuer node 412 without having to explicitly monitor the potentially large update files in and of themselves. Further, as each of sub-systems 406 may store the blockchains relating to the specific update files, computing device 402 need not store the blockchains for each of sub-systems 406. Instead, computing device 402 need only store the much smaller blocks of the version number block chains, decreasing the amount of long-term memory that need be present on computing device 402.

Figure 5:
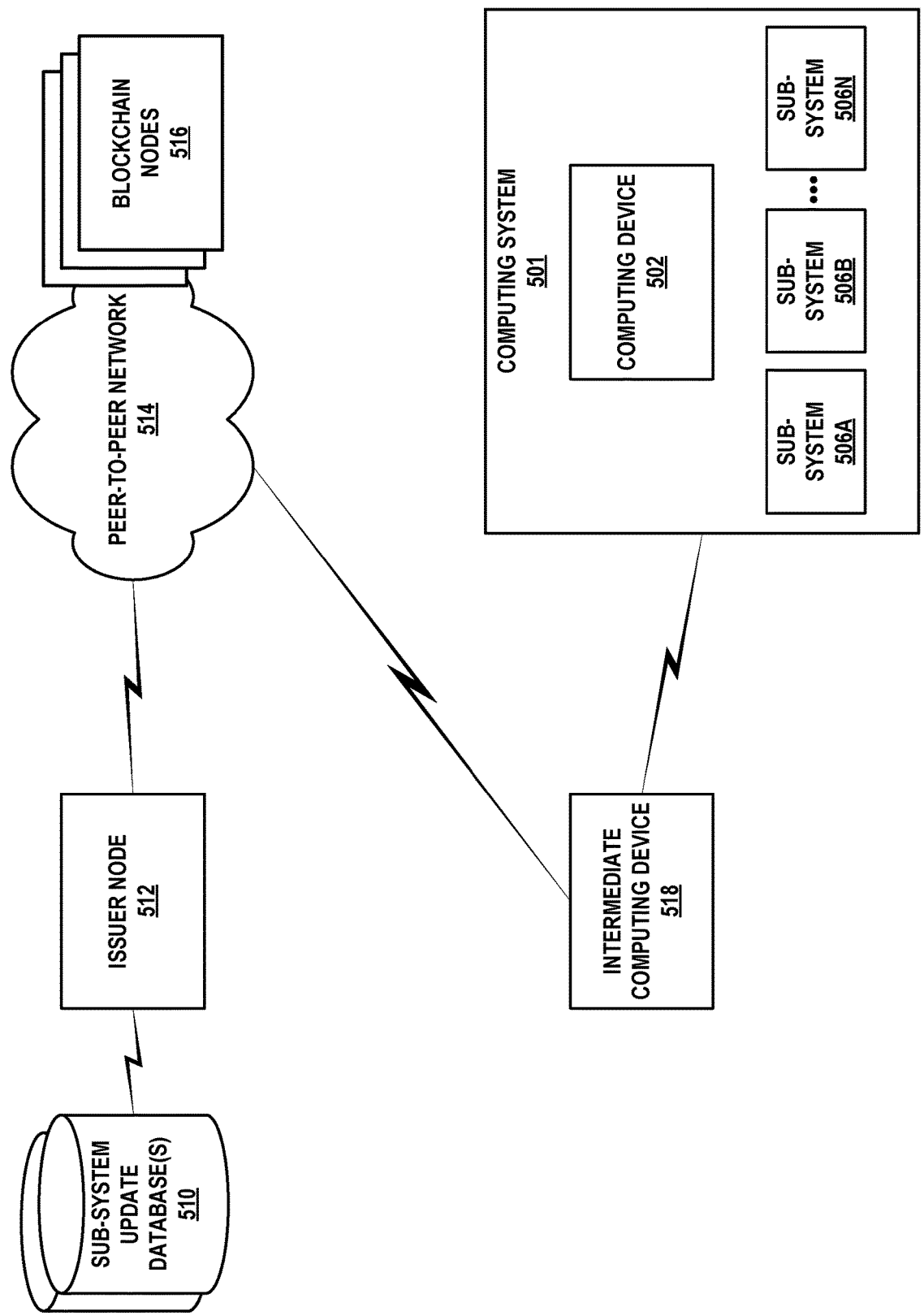
FIG. 5 is a conceptual diagram illustrating a system in which a computing system accesses a blockchain stored throughout a network in accordance with various aspects of the sub-system update techniques described in this disclosure.

FIG. 5 is a conceptual diagram illustrating a system in which a computing system accesses a blockchain stored throughout a network in accordance with various aspects of the sub-system update techniques described in this disclosure. As shown in the example of FIG. 5, the system includes computing system 501, issuer node 512, peer-to-peer network 514, one or more blockchain nodes 516, and intermediate computing device 518.

The system of FIG. 5 may function similarly to the system of FIG. 4, where sub-system update database 510 receives updates from issuer node 512, and where issuer node 512 pushes these updates is transactions to a blockchain stored throughout blockchain nodes 516 and computing system 501. However, instead of computing device 502 having to be directly connected to peer-to-peer network 514, intermediate computing device 518 may download the update file for one of sub-systems 506A-506N (collectively, sub-systems 506) over peer-to-peer network 514 (e.g., from issuer node 512). Intermediate computing device 518 may be a mobile computing device such as a smartphone, a tablet computer, a laptop computer, or any other device that may be configured to receive data over a network. Computing device 502 may then request the downloaded update file for one of sub-systems 506 from intermediate computing device 518 using a short-area communication protocol (e.g., Bluetooth®, Zig-Bee®, or the like). In instances where computing system 501 is a vehicle, it may be difficult for computing system 501 to be in communication range with another vehicle for a long enough time to obtain the update file for one of sub-systems 506. As such, by using intermediate computing device 518, computing system 501 can efficiently obtain the update file during normal operation, as intermediate computing device 518 may be located inside of the vehicle while the driver is operating the vehicle.

Furthermore, intermediate computing device 518 may not have the decryption key for the update file, meaning that intermediate computing device 518 is merely a relay for the update file to sub-systems 506 via computing device 502 and that intermediate computing device 518 is unable to access/alter the update file. Additionally, computing device 502 would not have the decryption key for the update file, and any other sub-system of sub-systems 506 other than the particular sub-system for which the update file is intended may not have the decryption key specific for that update file. In other words, for an update file that will update some aspect of sub-system 506A, only sub-system 506A would have the decryption key for the update file. None of computing device 502, intermediate computing device 518, sub-systems 506B-506N, or the portions of blockchain nodes 516 responsible for transmitting the update file would have access to the decryption key for the update file for sub-system 506A.

By only granting sub-system 506A access to the decryption key for the update file for sub-system 506A and restricting access to the update file of sub-system 506A for any intermediary component between issuer node 512 and sub-system 506A, the techniques described herein ensures that the update file remains unaltered. Any malicious or unapproved updates to the update file may create numerous issues in the system installing the update file, including bugs, crashes, loss of information, or unexpected operation or control of physical components in the system. By not giving intermediary devices access to the decryption key needed to decrypt the hashed update file, sub-system 506A may receive and install the update file as intended by the entity that generated the update file (e.g., issuer node 512). Therefore, sub-system 506A can trust the received update files transferred using the techniques described herein and install the update file without the need to perform any additional scans or analysis of the file itself outside of ensuring that the update file is received as part of a valid transaction in the blockchain(s) described herein.

Figure 6:
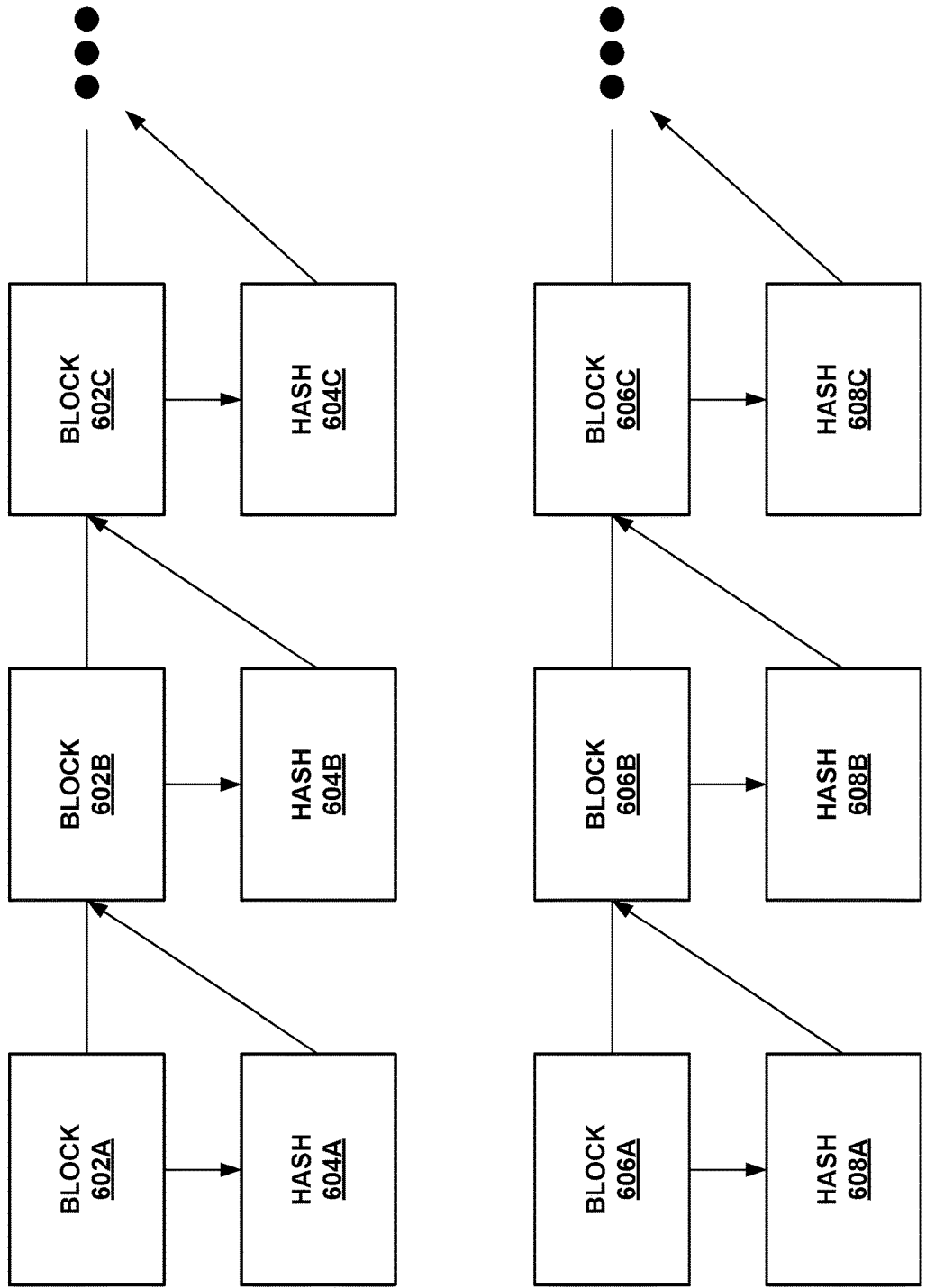
FIG. 6 is a conceptual diagram illustrating a dual-blockchain system that includes a first blockchain holding version numbers of a software or firmware update and a second blockchain holding the software or firmware update itself in accordance with various aspects of the sub-system update techniques described in this disclosure.

FIG. 6 is a conceptual diagram illustrating a dual-blockchain system that includes a first blockchain holding version numbers of a software or firmware update and a second blockchain holding the software or firmware update itself in accordance with various aspects of the sub-system update techniques described in this disclosure. A blockchain is a series of blocks (e.g., blocks 602A-602C (collectively, "blocks 602")) that are linked to one another using cryptography, such as a hash function. Each block of the blockchain includes a hashed version of the previous block of the blockchain, a timestamp of the update to the blockchain, the new information for the blockchain, and, potentially, additional information about the transaction adding the new information, such as a user identification or some other sort of metadata.

As shown in FIG. 6, block 602A may be a first block in a blockchain that includes a version number of a software file stored in block 606A, in a second blockchain, for a particular sub-system. An issuer node, such as issuer node 412 of FIG. 4, may produce a transaction, or an update to blockchains with a software update for the sub-system associated with the two blockchains of FIG. 6. To store this new information, the issuer node would first create hash block 604A by applying a hash function (or other cryptographic function) to block 602A. The issuer node may then append the new information to hash block 604A, thereby creating block 602B. The new information for block 602B may include the version number of the software update. Similarly, the issuer node may create hash block 608A by applying a different hash function (or other cryptographic function) to block 606A. The issuer node may then append the new information to hash block 608A, thereby creating block 606B. The new information for block 606B may include the software update itself for the sub-system. The issuer node may then disperse blocks 602B and 606B over a peer-to-peer network to any nodes connected to the issuer node, and those nodes may continue the dissemination of block 602B and 606B until each node configured to store the blockchain has a copy of block 602B and 606B stored in its local memory.

At later time, the issuer node may produce another transaction to update the blockchain again with yet another software update for the particular sub-system. To store this new information, the issuer node would first create hash block 604B by applying a hash function (or other cryptographic function) to block 602B. The issuer node may then append the new information to hash block 604B, thereby creating block 602C. The new information for block 602C may include the version number of the software update. Similarly, the issuer node may create hash block 608B by applying a different hash function (or other cryptographic function) to block 606B. The issuer node may then append the new information to hash block 608B, thereby creating block 606C. The new information for block 606C may include the software update itself for the sub-system. The issuer node may then disperse blocks 602C and 606C over a peer-to-peer network to any nodes connected to the issuer node, and those nodes may continue the dissemination of block 602C and 606C until each node configured to store the blockchain has a copy of block 602C and 606C stored in its local memory. This process may continue as additional blocks are added to each of the blockchains, such as with the addition of hash blocks 604C and 608C to create new blocks in the blockchains. Furthermore, each sub-system may include a similarly structured blockchain (e.g., one blockchain for version numbers of the update files of the respective sub-system, and one blockchain for the update files themselves for the respective sub-system).

This process may continue whenever the issuer node has an update to the software for the particular sub-system. While described above with respect to software, similar blockchains may be created for other sub-systems, for firmware updates to the sub-systems, or for software updates to applications executing on the various sub-systems.

Figure 7:
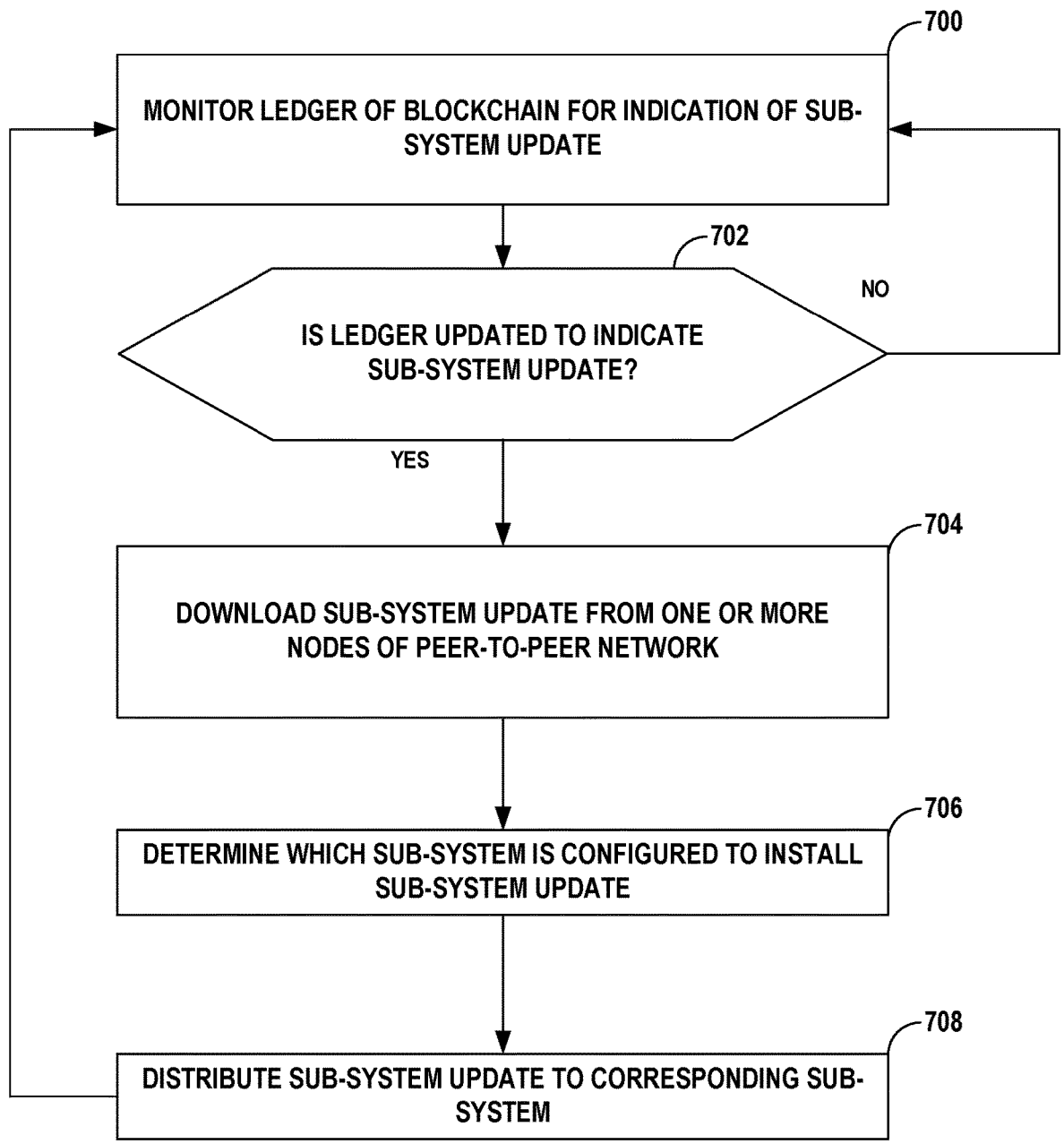
FIG. 7 is a flowchart illustrating example operation of the computing system shown in the example of FIG. 2 in performing various aspects of the sub-system update techniques described in this disclosure.

FIG. 7 is a flowchart illustrating example operation of the computing system shown in the example of FIG. 2 in performing various aspects of the sub-system update techniques described in this disclosure. Computing device 202 may first invoke blockchain module 230 to interface with electronic control units (ECUs) 220 to monitor a ledger of a blockchain for an indication that an update to software or firmware for a sub-system of the system containing computing device 202 is available (700). Blockchain module 230 may determine whether the ledger of the blockchain has been updated to indicate the sub-system update is available (702). If blockchain module 230 determines that no sub-system updates are available ("NO" branch of 702), blockchain module 230 may continue monitoring the ledger of the blockchain (700). Conversely, if blockchain module 230 determines that the ledger of the blockchain indicates a sub-system update is available for a particular sub-system ("YES" branch of 702), blockchain module 230 may download sub-system update files 250 from one or more nodes of a peer-to-peer network (704). Blockchain module 230 may store sub-system update files 250.

Computing device 202 may then invoke sub-system distribution module 232 to interface with electronic control units (ECUs) 220 to determine which sub-system is configured to install sub-system update files 250 (706). Sub-system distribution module 232 may then distribute the sub-system update to the corresponding sub-system (708). Computing device 202 may continue to operate in this manner (700-708) to perform real-time or near-real-time component verification (which is another way to refer to various aspects of the component verification techniques described in this disclosure).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
a plurality of sub-systems including a first sub-system and a second sub-system,
wherein each sub-system of the plurality of sub-systems comprise one or more processors, and wherein the one or more processors of the first sub-system are configured to:
monitor a ledger of a first blockchain for an update associated with the second sub-system;
download, from one or more nodes of a network, an update file for a sub-system update for the second sub-system in response to detecting the update associated with the second sub-system, wherein the first sub-system is different than the second sub-system,
wherein the first blockchain comprises information indicating sub-system updates for respective ones of the plurality of sub-systems, wherein a second blockchain comprises the update file for the sub-system update and an update file for each previous sub-system update for the second sub-system;
wherein the sub-system update comprises one or more of a software update for the second sub-system, a firmware update for the second sub-system, or an application update for an application executing on the second sub-system; and
distribute the sub-system update for the second sub-system to the second sub-system, and
wherein the one or more processors of the second sub-system is configured to install the update file using a sub-system update decryption key for the second sub-system, wherein only the second sub-system is able to access and use the sub-system update decryption key.

2. The device of claim 1, wherein the blockchain comprises a first blockchain, and wherein the one or more processors of the first sub-system are further configured to:
detect the update to the ledger of the first blockchain associated with the second sub-system includes a new version number associated with the sub-system update for the second sub-system,
wherein the sub-system update for the second sub-system corresponding to the new version number is stored throughout the network in the second blockchain.

3. The device of claim 1, wherein the second sub-system is configured to utilize the sub-system update decryption key to decrypt the sub-system update upon receiving the sub-system update, and wherein the first sub-system does not have access to the sub-system update decryption key to decrypt the sub-system update for the second sub-system.

4. The device of claim 1, wherein the blockchain comprises a first blockchain that indicates updates for the second sub-system, and wherein the one or more processors of the first sub-system are further configured to:
download, from the one or more nodes of the network, a sub-system update for a third sub-system of the plurality of sub-systems of the device in response to detecting an update to a ledger of the second blockchain that indicates updates for the third sub-system, wherein the third sub-system is different than the first sub-system and the second sub-system; and
distribute the sub-system update for the third sub-system to the third sub-system.

5. The device of claim 1, wherein the first blockchain comprises a hash of a version number of the sub-system update for the second sub-system, and wherein the one or more processors of the first sub-system are further configured to:
perform a listening function to detect the update to the ledger of the second blockchain associated with the second sub-system through the one or more nodes of the network.

6. The device of claim 1, wherein the one or more processors of the first sub-system being configured to download the sub-system update for the second sub-system comprise the one or more processors of the first sub-system being configured to:
download the sub-system update for the second sub-system using one or more of Wi-Fi® protocol, a cellular protocol, Bluetooth® protocol, or ZigBee® protocol, wherein the first sub-system is configured to communicate with the one or more nodes, wherein the second sub-system and each other sub-system of the plurality of sub-systems is in communication with the first sub-system.

7. The device of claim 6,
wherein the first sub-system is configured to communicate with the one or more nodes, wherein the second sub-system and each other sub-system of the plurality of sub-systems is in communication with the first sub-system.

8. The device of claim 1, wherein the network comprises a peer-to-peer communication network, and wherein the one or more processors of the first sub-system being configured to download the sub-system update for the second sub-system comprise the one or more processors of the first sub-system being configured to:
  download, from a first node of the peer-to-peer communication network, a first portion of the sub-system update for the second sub-system; and
  download, from a second node of the peer-to-peer communication network, a second portion of the sub-system update for the second sub-system.

9. The device of claim 1, wherein the one or more processors of the first sub-system being configured to distribute the sub-system update for the second sub-system to the second sub-system comprise the one or more processors of the first sub-system being configured to:
  determine, based on meta-data for the blockchain, that the sub-system update is for the second sub-system of the plurality of sub-systems; and
  send the sub-system update from the first sub-system to the second sub-system.

10. The device of claim 1, wherein the device comprises a vehicle.

11. The device of claim 10, wherein the one or more nodes comprise a non-vehicle mobile computing device.

12. A device comprising a plurality of sub-systems that includes a first sub-system and a second sub-system, the device further comprising:
  means for monitoring a ledger of a first blockchain for an update associated with the second sub-system, wherein the first sub-system is different than the second sub-system;
  means for downloading, from one or more nodes of a peer-to-peer communication network, and to the first sub-system of a plurality of sub-systems of the device, an update file for a sub-system update for the second sub-system from a second blockchain in response to detecting the update associated with the second sub-system, wherein the first blockchain comprises information indicating sub-system updates for respective ones of the plurality of sub-systems,
  wherein the second blockchain comprises the update file for the sub-system update and an update file for each previous sub-system update for the second sub-system,
  wherein the sub-system update comprises one or more of a software update for the second sub-system, a firmware update for the second sub-system, or an application update for an application executing on the second sub-system; and
  means for distributing the sub-system update for the second sub-system to the second sub-system, wherein the second sub-system is configured to install the update file using a sub-system update decryption key for the second sub-system, wherein only the second sub-system is able to access and use the sub-system update decryption key.

13. A method comprising:
  monitoring, by a first sub-system of a device comprising a plurality of sub-systems, a ledger of a first blockchain for an update associated with a second sub-system of the plurality of sub-systems, wherein the first sub-system is different than the second sub-system;
  downloading, by the first sub-system and from one or more nodes of a network, an update file for a sub-system update for the second sub-system in response to detecting the update associated with the second sub-system,
  wherein the first blockchain comprises information indicating respective sub-system updates for the plurality of sub-systems, wherein a second blockchain comprises the update file for the sub-system update and an update file for each previous sub-system update for the second sub-system, and
  wherein only the second sub-system is able to access and use a sub-system update decryption key used to decrypt the sub-system update for the second sub-system,
  wherein the sub-system update comprises one or more of a software update for the second sub-system, a firmware update for the second sub-system, or an application update for an application executing on the second sub-system; and
  distributing, by the first sub-system, the sub-system update for the second sub-system to the second sub-system, wherein the sub-system update is installed at the second sub-system using the sub-system update decryption key for the second sub-system.

14. The method of claim 13, wherein the blockchain comprises a first blockchain, and wherein the method further comprises:
  detecting, by the first sub-system, the update to the ledger of the first blockchain associated with the second sub-system includes a new version number associated with the sub-system update for the second sub-system,
  wherein the sub-system update for the second sub-system corresponding to the new version number is stored throughout the network in the second blockchain.

15. The method of claim 13, wherein the second sub-system is configured to utilize the sub-system update decryption key to decrypt the sub-system update upon receiving the sub-system update, and wherein the first sub-system does not have access to the sub-system update decryption key to decrypt the sub-system update for the second sub-system.

16. The method of claim 13, wherein the blockchain comprises a first blockchain that indicates updates for the second sub-system, and wherein the method further comprises:
  downloading, by the first sub-system, from the one or more nodes of the network, a sub-system update for a third sub-system of the plurality of sub-systems of the device in response to detecting an update to a ledger of the second blockchain that indicates updates for the third sub-system, wherein the third sub-system is different than the first sub-system and the second sub-system; and
  distributing, by the first sub-system, the sub-system update for the third sub-system to the third sub-system.

17. The method of claim 13, wherein downloading the sub-system update for the second sub-system comprises:
  downloading, by the first sub-system, the sub-system update for the second sub-system using one or more of Wi-Fi® protocol, a cellular protocol, Bluetooth® protocol, or ZigBee® protocol.

18. The method of claim 17,
  wherein the first sub-system is configured to communicate with the one or more nodes, wherein the second sub-system and each other sub-system of the plurality of sub-systems is in communication with the first sub-system.

19. The method of claim 13, wherein the network comprises a peer-to-peer communication network, and wherein downloading the sub-system update for the second sub-system comprises:
    downloading, by the first sub-system, from a first node of the peer-to-peer communication network, a first portion of the sub-system update for the second sub-system; and
    downloading, by the first sub-system, from a second node of the peer-to-peer communication network, a second portion of the sub-system update for the second sub-system.

20. The method of claim 13, wherein distributing the sub-system update for the second sub-system to the second sub-system comprises:
    determining, by the first sub-system, based on meta-data for the first blockchain, that the sub-system update is for the second sub-system of the plurality of sub-systems; and
    sending, by the first sub-system, the sub-system update from the first sub-system to the second sub-system.

\* \* \* \* \*